United States Patent
Dhanabalan et al.

(10) Patent No.: US 11,535,732 B2
(45) Date of Patent: Dec. 27, 2022

(54) POLYETHYLENE WITH POLYCARBONATE-SILOXANE FOR INCREASED ENVIRONMENTAL STRESS CRACK RESISTANCE

(71) Applicant: SABIC GLOBAL TECHNOLOGIES B.V., Bergen op Zoom (NL)

(72) Inventors: Anantharaman Dhanabalan, Geleen (NL); Sadasivam Gopalakrishnan, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 50 days.

(21) Appl. No.: 17/056,107

(22) PCT Filed: May 10, 2019

(86) PCT No.: PCT/EP2019/062041
§ 371 (c)(1),
(2) Date: Nov. 17, 2020

(87) PCT Pub. No.: WO2019/228783
PCT Pub. Date: Dec. 5, 2019

(65) Prior Publication Data
US 2021/0309839 A1    Oct. 7, 2021

Related U.S. Application Data

(60) Provisional application No. 62/677,319, filed on May 29, 2018.

(51) Int. Cl.
| | | |
|---|---|---|
| C08L 23/06 | (2006.01) | |
| B29B 9/06 | (2006.01) | |
| B29C 43/00 | (2006.01) | |
| B29K 23/00 | (2006.01) | |

(52) U.S. Cl.
CPC ............... C08L 23/06 (2013.01); *B29B 9/06* (2013.01); *B29C 43/003* (2013.01); *B29K 2023/065* (2013.01); *C08L 2201/08* (2013.01); *C08L 2203/16* (2013.01); *C08L 2203/30* (2013.01); *C08L 2205/03* (2013.01); *C08L 2207/062* (2013.01)

(58) Field of Classification Search
CPC .................................. C08L 83/10; C08L 23/06
See application file for complete search history.

(56) References Cited

U.S. PATENT DOCUMENTS

| | | | | |
|---|---|---|---|---|
| 3,189,662 | A * | 6/1965 | Vaughn, Jr. | C08G 64/186 524/588 |
| 4,560,498 | A * | 12/1985 | Horsma | H01B 1/24 252/511 |
| 4,616,064 | A | 10/1986 | Zukosky et al. | |
| 5,227,946 | A * | 7/1993 | Jacobs | H05B 1/02 219/505 |
| 5,616,674 | A * | 4/1997 | Michel | C08G 64/24 528/29 |
| 7,365,124 | B2 | 4/2008 | Srinivasan et al. | |
| 2003/0153688 | A1 * | 8/2003 | Lindahl | C08L 23/0815 525/240 |
| 2009/0036610 | A1 * | 2/2009 | Jaker | C08L 23/0815 525/240 |
| 2016/0022444 | A1 * | 1/2016 | Delaloye | A61F 2/82 623/1.11 |

OTHER PUBLICATIONS

International Search Report for International Application No. PCT/EP2019/062041, International Filing Date May 10, 2019, dated Jul. 2, 2019, 5 pages.
Written Opinion for International Application No. PCT/EP2019/062041, International Filing Date May 10, 2019, dated Jul. 2, 2019, 5 pages.

* cited by examiner

*Primary Examiner* — Jeffrey C Mullis
(74) *Attorney, Agent, or Firm* — Cantor Colburn LLP

(57) ABSTRACT

A polyethylene composition having increased environmental stress crack resistance (ESCR) is comprised of a polymer blend of a high density polyethylene (HDPE) and a polycarbonate-siloxane copolymer. The polycarbonate-siloxane copolymer is present in the polymer blend in an amount of from 0.5 wt. % to 15 wt. % by total weight of the polymer blend. In a method of forming a polyethylene composition having increased ESCR, a HDPE is modified by combining the HDPE with a polycarbonate-siloxane copolymer in a polymer blend, the polycarbonate-siloxane copolymer being present in an amount of from 0.5 wt. % to 15 wt. % by total weight of the polymer blend. The polymer blend can be formed into an article of manufacture, such as a bottle cap.

19 Claims, 2 Drawing Sheets

SEM image of HDPE incorporated with 10 wt.% of polycarbonate-siloxane copolymer

Figure-2. High resolution TEM image of HDPE incorporated with 10 wt% of polycarbonate-siloxane copolymer

POLYETHYLENE WITH POLYCARBONATE-SILOXANE FOR INCREASED ENVIRONMENTAL STRESS CRACK RESISTANCE

CROSS REFERENCE TO RELATED APPLICATIONS

The application is a National Stage application of PCT/EP2019/062041, filed May 10, 2019, which claims the benefit of U.S. Provisional Application No. 62/677,319, filed May 29, 2018.

TECHNICAL FIELD

The invention relates to high density polyethylene compositions that have improved environmental stress crack resistance.

BACKGROUND

Synthetic polymeric materials, particularly thermoplastic resins, are widely used in the manufacturing of a variety of end-use articles ranging from medical devices to food containers. Conventional polypropylene materials have long been used in processes like thermoforming, blow molding, coating, etc., requiring high melt strength which could be achieved by increasing molecular weight and broadening of molecular weight distribution. Molecular weight and molecular weight distribution can be modified in the polymerization process itself by choosing particular process conditions and catalysts.

Polypropylene (PP) has widely been used to produce caps and closures. To achieve a necessary cap strength, however, an inner liner (e.g., made from ethylene vinyl acetate (EVA), polyvinylchloride (PVC), butyl rubber, or the like) is typically required to achieve the requisite seal properties and organoleptic properties. Such two-layer caps are costly. On the other hand, high density polyethylene (HDPE) typically possesses requisite stiffness, flow properties, and better organoleptic properties for making one-piece closures, such as screw caps. HDPE, however, mostly lacks in its ability to resist cracking over time (as measured by environmental stress cracking resistance (ESCR) testing). Hence, there is a need to improve ESCR performance of HDPE compositions.

Attempts have been made to improve such performance. These include the incorporation of $C_4$, $C_6$, and/or $C_8$ comonomers used during polymerization, which may be carried out in the vapor phase or in solution. Fine-tuning the molecular weight distribution (bi- or multi-modal) has also been used as well as blending the polyethylene with other polymers. Cross-linking of silane grafting of polyethylene has also been used.

Given the growing trend of down-gauging of the plastic parts (for example, caps and closure, bottles and containers) and the use of plastic containers for storing aggressive chemicals (bleach bottles), an enhanced ESCR performance of plastics becomes more vital. For instance, a weight reduction of bottle caps from 3 g to 1.8-2.0 g, as currently demanded by many brand-owners, while still keeping its ESCR performance, is an emerging challenge.

While various methods exist to increase ESCR properties of polyethylene, many of these suffer in that they are cost prohibitive or applicable only to the method of making the starting polyethylene materials instead of to existing polyethylene materials. Thus, there is a continuing need for polyethylene-based compositions having increased ESCR, particularly for those that are suitable for cap and closure applications.

SUMMARY

A polyethylene composition having increased environmental stress crack resistance comprises a polymer blend of a high density polyethylene (HDPE) and a polycarbonate-siloxane copolymer that is present in an amount of from 0.1 wt. % to 15 wt. % by total weight of the polymer blend, preferably of from 5.0 to 15.0 wt %.

In particular embodiments, the HDPE is at least one of an unimodal, bimodal HDPE and multimodal HDPE. The polycarbonate of the polycarbonate-siloxane copolymer may be a bisphenol-A polycarbonate. In certain instances, the polycarbonate-siloxane copolymer is a bisphenol-A and eugenol end-capped siloxane copolymer.

The siloxane may be present in the polycarbonate-siloxane copolymer in an amount of from 2 mol % to 25 mol %.

The polymer blend may provide a molded article having an ESCR of at least 40 hours as determined by ASTM D1693-15B. In certain instances, the polymer blend provides a molded article having an ESCR of from 40 hours to 1000 hours as determined by ASTM D1693-15B.

The HDPE may be a copolymer with comonomers selected from 03 to OW alpha olefin monomers. The comonomers may be present in the HDPE copolymer in an amount of from 2 wt. % or less. In other instances the HDPE may be a neat HDPE.

The HDPE may have a melt flow ratio at 190° C. and 2.16 kg of 0.2 dg/min to 20 dg/min and/or a density of 945 kg/m³ to 965 kg/m³. In the context of the present invention, density of the HDPE may be determined in accordance with ISO 1183-1 (2012), method A, and the melt flow rate in accordance with ISO 1133-1 (2011).

In some embodiments, the siloxane of the polycarbonate-siloxane copolymer has a chain length of from 5 to 65 siloxane repeating units. The siloxane in the polycarbonate-siloxane may be a polymeric segment forming part of a polymer chain, in combination with segments comprising polycarbonate repeating units.

The polymer blend may further comprise a polycarbonate homopolymer. And in certain cases, the polymer blend may contain an additive of at least one of a nucleating agent, a heat conductive agent, a tie agent, an antiblocking agent, an antistatic agent, an antioxidant, a neutralizing agent, an acid scavenger, a blowing agent, a crystallization aid, a dye, a flame retardant agent, a filler, an impact modifier, a mold release agent, an oil, another polymer, a pigment, a processing agent, a reinforcing agent, a stabilizer, an UV resistance agent, a clarifying agent, a slip agent, a flow modifying agent, and combinations thereof.

The polymer blend can be formed into an article of manufacture. The article can include at least one of a film, a molded part, a container, a beverage container cap, a lid, a sheet, a pipe, a pipe coupling, a bottle, a cup, a tray, a pallet, and a toy. The article may be formed by at least one of injection molding, blow molding, compression molding, sheet extrusion, film blowing, pipe extrusion, profile extrusion, calendaring, and thermoforming.

In particular embodiments, the polycarbonate-siloxane copolymer is a bisphenol-A eugenol end-capped siloxane copolymer, with the siloxane being present in the polycarbonate-siloxane copolymer in an amount of from 2 mol % to 25 mol %. In other embodiments, the polycarbonate-siloxane copolymer may be present in an amount of from 0.2 wt. % to 5 wt. % by total weight of the polymer blend.

In a method of forming a polyethylene composition having increased environmental stress crack resistance, a high density polyethylene (HDPE) is modified by combining the HDPE with a polycarbonate-siloxane copolymer in a polymer blend. The polycarbonate-siloxane copolymer may be present in an amount of from 0.1 wt. % to 15 wt. % by total weight of the polymer blend. The polymer blend can be formed into one or more articles of manufacture.

BRIEF DESCRIPTION OF THE DRAWINGS

For a more complete understanding of the embodiments described herein, and the advantages thereof, reference is now made to the following descriptions taken in conjunction with the accompanying figure, in which.

DETAILED DESCRIPTION

Figure 1:
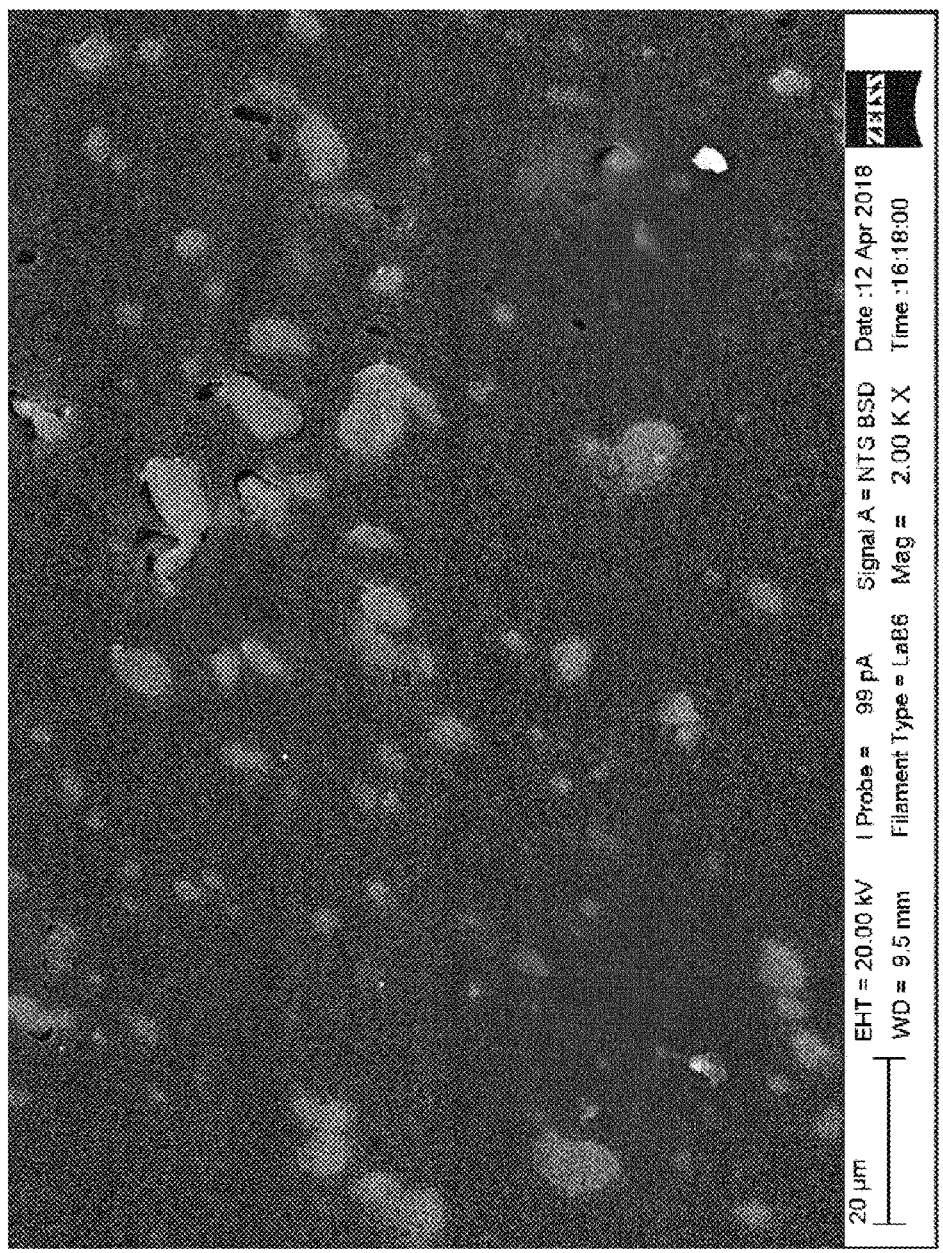
FIG. 1 is a scanning electron microscope (SEM) image of a polymer blend of bimodal HDPE incorporated with 10 wt. % polycarbonate-siloxane copolymer.

It has been discovered that the environmental stress crack resistance (ESCR) of high density polyethylene (HDPE) can be increased by incorporating an additive of a polycarbonate-siloxane copolymer. The polycarbonate-siloxane copolymer is incorporated into the HDPE by polymer melt blending. The amount of polycarbonate-siloxane copolymer incorporated into the HDPE is selected so that the processability of the HDPE remains relatively unaffected while its ESCR performance is enhanced.

The HDPE polymers used in the polymer blend can include those prepared by any of the polymerization processes, which are in commercial use (e.g., a "high pressure" process, a slurry process, a solution process and/or a gas phase process) and with the use of any of the known catalysts (e.g., multisite catalysts such as Ziegler Natta catalysts, and/or single site catalysts such as chromium or Phillips catalysts, metallocene catalysts, and the like).

The HDPE polyethylene can be unimodal, bimodal, multimodal HDPE or a combination of these. As used herein, where the phrase or term "high density polyethylene" or "HDPE" are used without characterization as unimodal, bimodal or multimodal HDPE, the phrase or term should be construed as referring to any or all of them. Bimodal and/or multimodal HDPE can be made using an advance cascade process. HDPE can be obtained from a commercial vendor. Non-limiting examples of suitable commercially available HDPE include those HDPE polymers marketed as SABIC® HDPE CC253 and SABIC® HDPE CC254 (SABIC®, Kingdom of Saudi Arabia). In certain aspects, the polymer blends of the present invention do not include polypropylene. In some embodiments, the polymer blends do not include linear low density polyethylene (LLDPE).

The HDPE can be characterized by various properties such as a melt flow ratio (MFR) at 190° C. and 2.16 kg, a density, ESCR, tensile strength at yield tensile modulus, tensile elongation at yield, Charpy notched impact strength (−30° C.), hardness or combinations thereof. The density of the unimodal, bimodal or multimodal HDPE can be from 945 kg/m³ to 965 kg/m³, or at least, equal to, and/or between any two of 945 kg/m³, 950 kg/m³, 955 kg/m³, 960 kg/m³, and 965 kg/m³.

It should be noted in the description, if a numerical value, concentration or range is presented, each numerical value should be read once as modified by the term "about" (unless already expressly so modified), and then read again as not so modified unless otherwise indicated in context. Also, in the description, it should be understood that an amount range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific points within the range, or even no point within the range, are explicitly identified or referred to, it is to be understood that the inventor appreciates and understands that any and all points within the range are to be considered to have been specified, and that inventor possesses the entire range and all points within the range.

In some embodiments, all or a portion of the HDPE component is unimodal. A MFR of unimodal HDPE at 190° C. and 2.16 kg can be from 0.2 dg/min to 20 dg/min or at least, equal to, and/or between any two of 0.2 dg/min, 0.3 dg/min, 0.4 dg/min, 0.5 dg/min, 0.75 dg/min, 1 dg/min, 1.25 dg/min, 1.5 dg/min, 1.75 dg/min, 2 dg/min, 3 dg/min, 4 dg/min, and 5 dg/min, 6 dg/min, 7 dg/min, 8 dg/min, 9 dg/min, 10 dg/min, 11 dg/min, 12 dg/min, 13 dg/min, 14 dg/min, 15 dg/min, 16 dg/min, 17 dg/min, 18 dg/min, 19 dg/min, and 20 dg/min. In particular embodiments, the MFR is from 0.5 dg/min to 5 dg/min.

Tensile modulus and/or flexural modulus of unimodal HDPE can be from 1000 MPa to 1300 MPa, or at least, equal to, and/or between any two of 1000 MPa, 1050 MPa, 1100 MPa, 1150 MPa, 1200 MPa, 1250 MPa, and 1300 MPa, as measured by ISO 527-2. Tensile and/or flexural strength at yield of unimodal HDPE can be from 20 MPa to 40 MPa, or at least, equal to, and/or between any two of 20 MPa, 25 MPa, 30 MPa, 35 MPa, and 40 MPa, as measured by ISO 527-2.

In some embodiments, all or a portion of the HDPE component is bimodal and/or multimodal. Bimodal or multimodal HDPE can have a MFR at 190° C. and 2.16 kg of from 0.5 dg/min to 5 dg/min or at least, equal to, and/or between any two of 0.2 dg/min to 20 dg/min or at least, equal to, and/or between any two of 0.2 dg/min, 0.3 dg/min, 0.4 dg/min, 0.5 dg/min, 0.75 dg/min, 1 dg/min, 1.25 dg/min, 1.5 dg/min, 1.75 dg/min, 2 dg/min, 3 dg/min, 4 dg/min, and 5 dg/min, 6 dg/min, 7 dg/min, 8 dg/min, 9 dg/min, 10 dg/min, 11 dg/min, 12 dg/min, 13 dg/min, 14 dg/min, 15 dg/min, 16 dg/min, 17 dg/min, 18 dg/min, 19 dg/min, and 20 dg/min. In particular embodiments, the MFR is from 0.5 dg/min to 5 dg/min.

In the context of the present invention, density of the HDPE may be determined in accordance with ISO 1183-1 (2012), method A, and the melt flow rate in accordance with ISO 1133-1 (2011).

Tensile modulus of bimodal or multimodal HDPE can be from 1000 MPa to 1300 MPa, or at least, equal to, and/or between any two of 1000 MPa, 1050 MPa, 1100 MPa, 1150 MPa, 1200 MPa, 1250 MPa and 1300 MPa, as measured by ASTM D638. Tensile strength at yield of bimodal and multimodal HDPE can be from 20 MPa to 40 MPa, or at least, equal to, and/or between any two of 20 MPa, 25 MPa, 30 MPa, 35 MPa, and 40 MPa, as measured by ASTM D638.

The Charpy notched impact strength of the HDPE component at −30° C. can be from 3 kJ/m² to 6 kJ/m² or at least, equal to, and/or between any two of 3 kJ/m², 4 kJ/m², 5 kJ/m², and 6 kJ/m².

In certain embodiments, the HDPE polyethylene component of the polymer blend will constitute homopolymers of ethylene. These may include homopolymers solely of neat HDPE. In other embodiments, however, the HDPE polyethylene may include a polymer blend with non-HDPE polyethylene. These may include low density polyethylene (LDPE), linear low density polyethylene (LLDPE), and medium density polyethylene (MDPE). When such non-HDPE polyethylene is used it may be present in the HDPE polymer component in an amount of from 2 wt. %, 1.5 wt. %, 1 wt. %, 0.5 wt. %, 0.1 wt. % or less. In other embodiments, the HDPE polyethylene component can include copolymers of ethylene with at least one $C_3$ to $C_{10}$ alpha olefin. Typically, this will be at least one of the alpha olefins of butene, hexene, and/or octene. In some embodiments the polyethylene is a copolymer with 1-butene (polyethylene-1-butene) or 1-hexene (polyethylene-1-hexene). When such copolymers are used, the non-ethylene comonomer may be present in the HDPE copolymer in an amount of from 2 wt. %, 1.5 wt. %, 1 wt. %, 0.5 wt. %, 0.1 wt. % or less.

In certain embodiments, the HDPE polyethylene may be an un-functionalized neat HDPE with no functional groups along the polymer chain. In particular embodiments, the HDPE $_p$olyet$_{hyt}$ene does not include any anhydride modified HDPE.

The HDPE component, as described above, is used as a polymer blend in combination with a polycarbonate-siloxane copolymer. To impart the desired ESCR characteristics of the final product, the polycarbonate-siloxane copolymer is used in an amount of from 0.1 wt. % to 15 wt. % by total weight of the polymer blend. In particular embodiments, the polycarbonate-siloxane copolymer is used in an amount of from 0.1 wt. % to 15 wt. % by total weight of the polymer blend or at least, equal to, and/or between any two of 0.1 wt. %, 0.2 wt. %, 0.3 wt. %, 0.4 wt. %, 0.5 wt. %, 0.6 wt. %, 0.7 wt. %, 0.8 wt. %, 0.9 wt. %, 1 wt. %, 1.5 wt. %, 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, and 15 wt. % by total weight of the polymer blend.

The polycarbonate siloxane copolymer component of the polymer blend may have an average molecular weight of from 10,000 to 60,000 or at least, equal to, and/or between any two molecular weights of 10,000, 15,000, 20,000, 25,000, 30,000, 35,000, 40,000, 45,000, 50,000, 55,000, and 60,000. The polycarbonate component of the polycarbonate-siloxane copolymer may be present in an amount of from 75 mol % to 98 mol %, or at least, equal to, and/or between 75 mol %, 76 mol %, 77 mol %, 78 mol %, 79 mol %, 80 mol %, 81 mol %, 82 mol %, 83 mol %, 84 mol %, 85 mol %, 86 mol %, 87 mol %, 88 mol %, 89 mol %, 90 mol %, 91 mol %, 92 mol %, 93 mol %, 94 mol %, 95 mol %, 96 mol %, 97 mol %, and 98 mol %.

The carbonate monomers used to form the polycarbonate may include phosgene, dimethylcarbonate and/or diphenylcarbonate. In particular embodiments, one of the aromatic dihydroxy comonomer used for making the polycarbonate-siloxane copolymer is a bisphenol-A. Comonomers that may be used include those described in U.S. Pat. No. 7,365,124, which is incorporated herein by reference for such purpose. These include but are not limited to 2,4'-dihydroxydiphenylmethane, bis(2-hydroxyphenyl)methane, bis(4-hydroxyphenyl)methane, bis(4-hydroxy-5-nitrophenyl)methane, bis(4-hydroxy-2,6-dimethyl-3-methoxyphenyl)methane, 1,1-bis(4-hydroxyphenyl)ethane, 1,1-bis(4-hydroxy-2-chlorophenyl)ethane, 2,2-bis(4-hydroxyphenyl)propane (bisphenol A); 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2;2-bis(3-t-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 2,2-bis(4-hydroxy-3-ethylphenyl)propane, 2,2-bis(4-hydroxy-3,5-dimethylphenyl)propane, 2,2-bis(3,5,3',5'-tetrachloro-4,4'-dihydroxyphenyl)propane, bis(4-hydroxyphenyl) cyclohexylmethane, 2,2-bis(4-hydroxyphenyl)-1-phenylpropane, 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(4'-hydroxy-3'-methylphenyl) cyclohexane (DMBPC), 1,1-bis(3,5-dimethyl-4-hydroxyphenyl)cyclohexane; 4,4'-[1-methyl-4-(1-methyl-ethyl)-1,3-cyclohexanediol]bisphenol (1,3 BHPM), 4-[1-[3-(4-hydroxyphenyl)-4-methylcyclohexyl]-1-methyl-ethyl]-phenol (2,8 BHPM), 3,8-dihydroxy-5a, 10b diphenylcoumarano-2',3',2,3-coumarane (DCBP), 2-phenyl-3,3-bis(4-hydroxyphenyl)phthalimidine, 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1, 1-bis(4-hydroxy-2,3,5,6-tetrabromophenyl)cyclohexane; 1, 1-bis(4-hydroxy-2,3,5,6-tetramethylphenyl)cyclohexane; 1, 1-bis(2,6-dichloro-3,5-dimethyl-4-hydroxyphenyl)cyclohexane; hydroxyphenyl)cyclohexane; 1,1-bis(2,6-dibromo-3,5-dimethyl-4-1,1-bis(4-hydroxyphenyl)-3,3,5-trimethylcyclohexane; 1,1-bis(3-chloro-4-hydroxyphenyl)-3,3,5-trimethylcyclohexane; 1, 1-bis(3-bromo-4-hydroxyphenyl)-3,3,5-trimethylcyclohexane; 1, 1-bis(4-hydroxy-3-methylphenyl)-

3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4-bis(4-hydroxyphenyl)heptane, 4,4'-dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-(3,3,5-trimethylcyclohexylidene)diphenol, 4,4'-bis(3,5-dimethyl)diphenol, 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene, 1,4-bis(2-(4-hydroxy-3-methylphenyl)-2-propyl)benzenedihydroxydiphenylsulfone (BPS), 2,4'-dihydroxyphenyl sulfone, 4,4'-bis(4-hydroxyphenyl)methane, 2,6-dihydroxynaphthalene; hydroquinone; resorcinol, C1-C3 alkyl-substituted resorcinols, 3-(4-hydroxyphenyl)-1,1,3-trimethylindan-5-ol, 1-(4-hydroxyphenyl)-1,3,3-trimethylindan-5-ol, and 2,2,2',2'-tetrahydro-3,3,3',3'-tetramethyl-1,1'-spirobi[1H-indene]-6,6'-diol. The most typical aromatic dihydroxy compound is Bisphenol A (BPA).

In some embodiments, an isosorbide comonomer can be used with the 2-hydrocarbyl-3,3-bis(4-hydroxyaryl)phthalimidine monomer to produce polycarbonate copolymers.

The copolycarbonates may have an average molecular weight (Mw) of from 3000 to approximately 150,000. In the context of the present invention, the average molecular weight of a polymer is to be understood to be the weight average molecular weight. In the context of the present invention, molecular weights are to be understood to be expressed in g/mol.

The siloxane is present in the polycarbonate-siloxane copolymer in an amount of from 2 mol % to 25 mol %, or at least, equal to, and/or between 2 mol %, 3 mol %, 4 mol %, 5 mol %, 6 mol %, 7 mol %, 8 mol %, 9 mol %, 10 mol %, 11 mol %, 12 mol %, 13 mol %, 14 mol %, 15 mol %, 16 mol %, 17 mol %, 18 mol %, 19 mol %, 20 mol %, 21 mol %, 22 mol %, 23 mol %, 24 mol %, and 25 mol %. The siloxane of the polycarbonate-siloxane copolymer may be a eugenol end-capped siloxane in particular embodiments. In further embodiments, the siloxane of the polycarbonate-siloxane copolymer may be composed of a chain of siloxane units composed of those siloxane D-units having the formula $(R)_2SiO$ unit where R is a C1 to C4 alkane. The chain length of the siloxane repeating D units may range from 5 to 65 units or at least, equal to, and/or between 5, 6, 7, 8, 9, 10, 15, 20, 25, 30, 35, 40, 45, 50, 55, and 65 units.

In certain embodiments, the polymer blend of HDPE and polycarbonate-siloxane copolymer may also contain a polycarbonate homopolymer. The polycarbonate homopolymers may be present in an amount of from 0.1 wt. % to 40 wt. % by total weight of the polymer blend or at least, equal to, and/or between any two of 0.1 wt. %, 0.2 wt. %, 0.3 wt. %, 0.4 wt. %, 0.5 wt. %, 0.6 wt. %, 0.7 wt. %, 0.8 wt. %, 0.9 wt. %, 1 wt. %, 1.5 wt. %, 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, and 15 wt. %, 16 wt. %, 17 wt. %, 18 wt. %, 19 wt. %, 20 wt. %, 21 wt. %, 22 wt. %, 23 wt. %, 24 wt. %, 25 wt. %, 26 wt. %, 27 wt. %, 28 wt. %, 29 wt. %, 30 wt. %, 31 wt. %, 32 wt. %, 33 wt. %, 34 wt. %, 35 wt. %, 36 wt. %, 37 wt. %, 38 wt. %, 39 wt. %, and 40 wt. % by total weight of the polymer blend.

The carbonate monomers used to form the polycarbonate homopolymer may be the same as used for the polycarbonate component of the polycarbonate-siloxane copolymer, as has been previously described. These may include phosgene, dimethylcarbonate and/or diphenylcarbonate. In particular embodiments, the polycarbonate of the polycarbonate-siloxane copolymer is a bisphenol-A polycarbonate. The polyethylene compositions can further include at least one additive. Non-limiting examples of additives include a nucleating agent, a heat conductive agent, a tie agent, an antiblocking agent, an antistatic agent, an antioxidant, a neutralizing agent, an acid scavenger, a blowing agent, a crystallization aid, a dye, a flame retardant agent, a filler (hard or soft), an impact modifier, a mold release agent, an oil, another polymer, a pigment, a processing agent, a reinforcing agent, a stabilizer (including light stabilizers), an UV resistance agent, a clarifying agent, a slip agent, a flow modifying agent, and combinations thereof.

Non-limiting examples of nucleating agents include calcium carbonate (CaCO3), barium sulfate (BaSO4), silica (SiO2), kaolin, talc, mica, titania (TiO2), alumina (Al2O3), a zeolite, mono- or polycarboxylic aromatic acid, a dye, a pigment, metal carboxylates, metal aromatic carboxylate, hexahydrophthalic acid metal salts, stearates, organic phosphates, bisamides, sorbitols, or a combination thereof. A non-limiting example of metal aromatic carboxylate includes sodium benzoate.

In certain aspects, a heat conductive additive is present in the polymer blend in an amount of at least, equal to, and/or between any two of 0.01 wt. %, 0.2 wt. %, 0.3 wt. %, 0.4 wt. %, 0.5 wt. %, 0.6 wt. %, 0.7 wt. %, 0.8 wt. %, 0.9 wt. %, and 1.0 wt. % by total weight of the polymer blend. Non-limiting examples of heat conductive additive include, aluminum oxide, titanium dioxide, graphitic compounds, graphenes, boron nitride, aluminum nitride, zinc oxide In certain aspects, a tie molecule is present in the polymer blend in amount of at least, equal to, and/or between any two of 0.01 wt. %, 0.2 wt. %, 0.3 wt. %, 0.4 wt. %, 0.5 wt. %, 0.6 wt. %, 0.7 wt. %, 0.8 wt. %, 0.9 wt. %, and 1.0 wt. % by total weight of the polymer blend. Non-limiting examples of tie molecule include, linear low density polyethylene, low density polyethylene, medium density polyethylene.

In certain aspects, a filler is present in the polymer blend in amount of at least, equal to, and/or between any two of 0.01 wt. %, 0.2 wt. %, 0.3 wt. %, 0.4 wt. %, 0.5 wt. %, 0.6 wt. %, 0.7 wt. %, 0.8 wt. %, 0.9 wt. %, 1.0 wt. %, 2.0 wt. %, 3.0 wt. %, 4.0 wt. %, 5.0 wt. %, 6.0 wt. %, 7.0 wt. %, 8.0 wt. %, 9.0 wt. %, 10.0 wt. %, 20.0 wt. %, and 30.0 wt. % by total weight of the polymer blend. The filler can be a hard filler. Non-limiting examples of hard filler include, inorganic particulate fillers such as silica, calcium carbonate, inorganic layered fillers such as clays, mica. The filler can also be a soft filler. Non-limiting examples of soft filler include, immiscible particulate elastomeric/polymeric resins. The filler can also be a hollow filler. Non-limiting examples of hollow fillers include, glass microspheres, plastic microspheres, ceramic microspheres such as cenospheres made up of alumino silicate microspheres, metallic microspheres made up of aluminum and copper/silver microspheres, phenolic microspheres.

In certain aspects, a light stabilizer is present in the polymer blend in an amount of at least, equal to, and/or between any two of 0.01 wt. %, 0.2 wt. %, 0.3 wt. %, 0.4 wt. %, 0.5 wt. %, 0.6 wt. %, 0.7 wt. %, 0.8 wt. %, 0.9 wt. %, and 1.0 wt. % by total weight of the polymer blend. The light stabilizer can be a hindered amine light stabilizer. The term "hindered amine light stabilizer" refers to a class of amine compounds having certain light stabilizing properties. Non-limiting examples, of hindered amine light stabilizers (HALS) include 1-cyclohexyloxy-2,2,6,6-tetramethyl-4-octadecylaminopiperidine; bis(2,2,6,6-tetramethylpiperidin-4-yl) sebacate; bis(1-acetoxy-2,2,6,6-tetramethylpiperidin-4-yl) sebacate; bis(1,2,2,6,6-pentamethylpiperidin-4-yl) sebacate; bis(1-cyclohexyloxy-2,2,6,6-tetramethylpiperidin-4-yl) sebacate; bis(1-octyloxy-2,2,6,6-tetramethylpiperidin-4-yl) sebacate; bis(1-acyl-2,2,6,6-tetramethylpiperidin-4-yl) sebacate; bis(1,2,2,6,6-pentamethyl-4-piperidyl) n-butyl-3,5-di-tert-butyl-4-hydroxybenzyl malonate; 2,4-bis[(1-cyclohexyloxy-2,2,6,6-tetramethylpiperidin-4-yl)butylamino]-6-(2-hydroxyethyl amino-s-triazine; bis(1-cyclohexyloxy-2,2,6,6-tetramethylpiperidin-4-yl) adipate; 2,4-bis[(1-cyclohexyloxy-2,2,6,6-piperidin-4-yl)butylamino]-6-chloro-s-triazine; 1-(2-hydroxy-2-methylpropoxy)-4-hydroxy-2,2,6,6-tetramethylpiperidine; 1-(2-hydroxy-2-methylpropoxy)-4-oxo-2,2,6,6-tetramethylpiperidine; 1-(2-hydroxy-2-methyl propoxy)-4-octadecanoyloxy-2,2,6,6-tetramethyl piperidine; bis(1-(2-hydroxy-2-methylpropoxy)-2,2,6,6-tetramethylpiperidin-4-yl) sebacate; bis(1-(2-hydroxy-2-methylpropoxy)-2,2,6,6-tetramethylpiperidin-4-yl) adipate; 2,4-bis{N-[1-(2-hydroxy-2-methyl propoxy)-2,2,6,6-tetramethylpiperidin-4-yl]-N-butylamino}-6-(2-hydroxyethylamino)-s-triazine; 4-benzoyl-2,2,6,6-tetramethylpiperidine; di-(1,2,2,6,6-pentamethylpiperidin-4-yl) p-methoxybenzylidenemalonate; 2,2,6,6-tetramethylpiperidin-4-yl octadecanoate; bis(1-octyloxy-2,2,6,6-tetramethylpiperidyl) succinate; 1,2,2,6,6-pentamethyl-4-aminopiperidine; 2-undecyl-7,7,9,9-tetramethyl-1-oxa-3,8-diaza-4-oxo-spiro[4,5]decane; tris(2,2,6,6-tetramethyl-4-piperidyl) nitrilotriacetate; tris(2-hydroxy-3-(amino-(2,2,6,6-tetramethylpiperidin-4-yl)propyl) nitrilotriacetate; tetrakis(2,2,6,6-tetramethyl-4-piperidyl)-1,2,3,4-butane-tetracarboxylate; tetrakis(1,2,2,6,6-pentamethyl-4-piperidyl)-1,2,3,4-butane-tetracarboxylate; 1,1'-(1,2-ethanediyl)-bis(3,3,5,5-tetramethylpiperazinone); 3-n-octyl-7,7,9,9-tetramethyl-1,3,8-triazaspiro[4.5]decan-2,4-dione; 8-acetyl-3-dodecyl-7,7,9,9-tetramethyl-1,3,8-triazaspiro[4.5]decane-2,4-dione; 3-dodecyl-1-(2,2,6,6-tetramethyl-4-piperidyl)pyrrolidin-2,5-dione; 3-dodecyl-1-(1,2,2,6,6-pentamethyl-4-piperidyl)pyrrolidine-2,5-dione; N,N'-bis-formyl-N,N'-bis(2,2,6,6-tetramethyl-4-piperidyl) hexamethylenediamine; reaction product of 2,4-bis[(1-cyclohexyloxy-2,2,6,6-piperidin-4-yl)butylamino]-6-chloro-s-triazine with N,N'-bis(3-aminopropyl)ethylenediamine); condensate of 1-(2-hydroxyethyl)-2,2,6,6-tetramethyl-4-hydroxypiperidine and succinic acid; condensate of N,N'-bis(2,2,6,6-tetramethyl-4-piperidyl)-hexamethylenediamine and 4-tert-octylamino-2,6-dichloro-1,3,5-triazine; condensate of N,N'-bis(2,2,6,6-tetramethyl-4-piperidyl)-hexamethylenediamine and 4-cyclohexylamino-2,6-dichloro-1,3,5-triazine; condensate of N,N'-bis-(2,2,6,6-tetramethyl-4-piperidyl)hexamethylenediamine and 4-morpholino-2,6-dichloro-1,3,5-triazine; condensate of N,N'-bis-(1,2,2,6,6-pentamethyl-4-piperidyl)hexamethylenediamine and 4-morpholino-2,6-dichloro-1,3,5-triazine; condensate of 2-chloro-4,6-bis(4-n-butylamino-2,2,6,6-tetramethyl piperidyl)-1,3,5-triazine and 1,2-bis(3-aminopropylamino)ethane; condensate of 2-chloro-4,6-di-(4-n-butylamino-1,2,2,6,6-pentamethylpiperidyl)-1,3,5-triazine and 1,2-bis-(3-aminopropylamino)ethane; a reaction product of 7,7,9,9-tetramethyl-2-cycloundecyl-1-oxa-3,8-diaza-4-oxospiro[4,5]decane and epichlorohydrin; poly[methyl, (3-oxy-(2,2,6,6-tetramethylpiperidin-4-yl)propyl)]siloxane, CAS #182635-99-0; reaction product of maleic acid anhydride-C18-C22-α-olefin-copolymer with 2,2,6,6-tetramethyl-4-aminopiperidine; oligomeric condensate of 4,4'-hexamethylenebis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine; oligomeric condensate of 4,4'-hexamethylenebis(amino-1,2,2,6,6-pentaamethylpiperidine) and 2,4-dichloro-6-[(1,2,2,6,6-pentaamethylpiperidin-4-yl)butylamino]-s-triazine end-capped with 2-chloro-4,6-bis(dibutylamino)-s-triazine; oligomeric condensate of 4,4'-hexamethylenebis (amino-1-propoxy-2,2,6,6-tetramethyl piperidine) and 2,4-dichloro-6-[(1-propoxy-2,2,6,6-tetramethylpiperidin-4-yl) butylamino]-s-triazine end-capped with 2-chloro-4,6-bis (dibutylamino)-s-triazine; oligomeric condensate of 4,4'-hexamethylenebis(amino-1-acyloxy-2,2,6,6-tetramethyl piperidine) and 2,4-dichloro-6-[(1-acyloxy-2,2,6,6-tetramethylpiperidin-4-yl)butylamino]-s-triazine end-capped with 2-chloro-4,6-bis(dibutylamino)-s-triazine; and product obtained by reacting (a) with (b) where (a) is product obtained by reacting 1,2-bis(3-aminopropylamino)ethane with cyanuric chloride and (b) is (2,2,6,6-tetramethyl piperidin-4-yl)butylamine. Also included are the sterically hindered N—H, N-methyl, N-methoxy, N-hydroxy, N-propoxy, N-octyloxy, N-cyclohexyloxy, N-acyloxy and N-(2-hydroxy-2-methylpropoxy) analogues of any of the above mentioned compounds. Non-limiting examples of commercial light stabilizer are available from BASF under the trade name Uvinul® 4050H, 4077H, 4092H, 5062H, 5050H, 4092H, 4077H, 3026, 3027, 3028, 3029, 3033P, and 3034 or Tinuvin® 622.

Anti-static agents can be used to inhibit accumulation of dust on plastic articles. Antistatic agents can improve the electrical conductivity of the plastic compositions, and thus dissipate any surface charges, which develop during production and use. Thus, dust particles are less attracted to the surface of the plastic article, and dust accumulation is consequently reduced. In certain aspects of the present invention, the antistatic agent can be a glycerol monostearate. The polymer blend can include an anti-static agent in an amount of at least, equal to, and/or between any two 0.01 wt. %, 0.2 wt. %, 0.3 wt. %, 0.4 wt. %, 0.5 wt. %, 0.6 wt. %, 0.7 wt. %, 0.8 wt. %, 0.9 wt. %, and 1 wt. % by total weight of the polymer blend.

A lubricant can be added to a polymer blend to improve the mold-making characteristics. The lubricant can be a low molecular compound from a group of fatty acids, fatty acid esters, wax ester, fatty alcohol ester, amide waxes, metal carboxylate, montanic acids, montanic acid ester, or such high molecular compounds, as paraffins or polyethylene waxes. In certain aspects of the present invention, the lubricant is a metal stearate. Non-limiting examples of metal stearates include zinc stearate, calcium stearate, lithium stearate or a combination thereof, preferably calcium stearate. The polymer blend can include a lubricant in an amount of at least, equal to, and/or between any two of 0.01 wt. %, 0.2 wt. %, 0.3 wt. %, 0.4 wt. %, 0.5 wt. %, 0.6 wt. %, 0.7 wt. %, 0.8 wt. %, 0.9 wt. %, and 1 wt. % by total weight of the polymer blend.

An antioxidant can provide protection against polymer degradation during processing. Phosphites are known thermal oxidative stabilizing agents for polymers and other organic materials. The antioxidant can be a phosphite-based antioxidant. In certain aspects phosphite-antioxidants include, but are not limited to, triphenyl phosphite, diphenylalkyl phosphites, phenyldialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite tristearyl sorbitol triphosphite, and tetrakis(2,4-di-tertbutylphenyl)-4,4'-biphenylene diphosphonite, bis(2,4-dicumylphenyl)pentaerythritol diphosphite. The polymer blend can include an antioxidant in an amount of at least, equal to, and/or between any two of 0.01 wt. %, 02 wt. %, 0.3 wt. %, 0.4 wt. %, 0.5 wt. %, 0.6 wt. %, 0.7 wt. %, 0.8 wt. %, 0.9 wt. %, and 0.1 wt. % by total weight of the polymer blend. Non-limiting examples of commercially available antioxidants include Irganox 1010 available from BASF, or Doverphos S9228T available from Dover Chemical Company.

In forming the composition, the various components of the HDPE and polycarbonate-siloxane copolymer, which may be in the form of pellets, powder, or fluff, along with any additives, can be dry blended. These materials combined in a customary mixing machine, in which the HDPE and polycarbonate-siloxane copolymer are mixed with the optional additives. The optional additives can be added at the end or during the processing steps to produce the polymer blend. Suitable machines for such mixing are known to those skilled in the art. Non-limiting examples include mixers, kneaders, extruders, and molders. These materials are then fed directly into the feed zone of an extruder. In certain aspects, the process can be carried out in an extruder and introduction of the additives may occur during processing. Non-limiting examples of suitable extruders include single-screw extruders, counter-rotating and co-rotating twin-screw extruders, planetary-gear extruders, ring extruders, or co-kneaders. The process can be performed at a temperature from 160° C. to 280° C.

In some embodiments, the HDPE and polycarbonate-siloxane copolymer, and optionally one or more additives, used to produce the polymer blend of the present invention can be melt-extruded by following typical procedures of weighing the required amounts of the HDPE, polycarbonate-siloxane copolymer and other additives, followed by dry blending, and then feeding the mixture into a main feeder of a twin-screw co-rotating extruder (length/diameter (L/D) ratio of 25:1 or 40:1) to obtain the final composition. The HDPE, polycarbonate-siloxane copolymer, or blend thereof can be subjected to an elevated temperature for a sufficient period of time during blending. The blending temperature can be above the softening point of the polymers. In certain aspects, the extrusion process can be performed at a temperature from 160° C. to 280° C. The copolymer can be added along with other additives in-line and prior to pelletization of HDPE resin during the production process. The amounts of polycarbonate-siloxane copolymer combined with the HDPE can be adjusted to provide those weight amounts previously discussed.

Additives can be premixed or added individually to the polymer blend or the different components thereof. By way of example, the additives of the present invention can be premixed such that the blend is formed prior to adding it to the HDPE or the polycarbonate-siloxane copolymer. The additive-containing blend thereof can be subjected to an elevated temperature for a sufficient period of time during blending and/or incorporation of additives. Incorporation of additives into the polyolefin resin can be carried out, for example, by mixing the above-described components using methods customary in process technology. The blending temperature can be above the softening point of the polymers. In certain aspects, a process can be performed at a temperature from 160° C. to 280° C. Such "melt mixing" or "melt compounding" results in uniform dispersion of the present additives in the HDPE and/or polycarbonate-siloxane copolymer.

Articles of manufacture (e.g., caps) that include the polymer blend can have a higher ESCR than articles of manufacture made from HDPE without the polycarbonate-siloxane copolymer (i.e., the HDPE used to prepare the blend). In some embodiments, the articles of manufacture of the present invention have an ESCR that is 200% to 1000% greater than the ESCR values of HDPE articles of manufacture with the same configuration using the same HDPE without the use of the polycarbonate-siloxane copolymer. The ESCR values can be at least, equal to, or between any two of 200%, 300%, 400%, 500%, 600%, 700%, 800%, 900% and 1000% greater than the ESCR HDPE values without the use of polycarbonate-siloxane copolymer. As exemplified in the Examples section and throughout the specification, polymer blend containing articles of manufacture of the present invention can have an ESCR values from at least 20 hours to 1000 hours (e.g., 20, 30, 40, 50, 60, 70, 80, 90, 100, 110, 120, 130, 140, 150, 160, 170, 180, 190, 200, 300, 400, 500, 600, 700, 800, 900, and 1000, and any range or value there between and including the endpoints). In contrast HDPE articles of manufacture without the polycarbonate-siloxane copolymer, can have an ESCR values of less than but not equal to 20 hours.

The polymer blend compositions formed as described are normally collected as pellets, which can be stored for a time or employed immediately in a forming process. The forming processes can include injection molding, blow molding, compression molding, sheet extrusion, film blowing, pipe extrusion, profile extrusion, calendaring, thermoforming, rotomolding, or combinations thereof. The final formed articles can be, for instance, molded parts, sheets, films, or fibers. Examples of molded parts include a cap, a bottle cap, a container, a lid, a sheet, a pipe, a pipe coupling, a bottle, a cup, a tray, a pallet, or a toy, or combinations thereof. Caps can be injection and/or compression molded. The caps may be threaded or non-threaded caps for selectively closing off openings to bottles or other containers. Such caps can be used in a variety of food and non-food applications. By way of example, caps that include the polymer blend of the present invention can be used with containers for storing still water, carbonated beverages, pressurized beverages, or the like.

The invention, in a certain embodiment, also relates to the use in a polymer blend comprising high-density polyethylene of a polycarbonate-siloxane copolymer present in an amount of from 0.1 wt. % to 15 wt. %, preferably of from 5.0 to 15.0 wt %, by total weight of the polymer blend, for increase of the environmental stress crack resistance of a polymer composition comprising the blend.

The following examples serve to further illustrate various embodiments and applications.

EXAMPLES

Example 1

A polycarbonate-siloxane copolymer containing 20 mol % siloxane with 45 siloxane repeating units (—O—Si(CH$_3$)$_2$—) and a molecular weight (MW) of approximately 30,000 (calculated w.r. to polystyrene monodispersed standard) was dry mixed in different amounts of from 5 wt. % to 10 wt. % with commercially available HDPE. The HDPE used was SABIC® HDPE CC253 and SABIC® HDPE CC254. SABIC® HDPE CC253 is a unimodal HDPE having a MFR at 190° C. and 2.16 kg of 1.8 dg/min and a density of 952 kg/m$^3$. SABIC® HDPE CC254 is a bimodal HDPE having a MFR at 190° C. and 2.16 kg of 2.1 dg/min and a density of 953 kg/m$^3$. For comparison purposes, neat HDPE without any polycarbonate-siloxane copolymer was also tested. The different mixtures were fed into a hopper of a ZSK-25 mm 6 barrel twin-screw extruder with an L/D ratio of 25:1. The operating parameters used are set forth in Table 1 below:

TABLE 1

| Barrel-1 (Attached with Hopper) | Temp. = 160° C. |
| Barrel-2 | Temp. = 185° C. |
| Barrel-3 | Temp. = 195° C. |
| Barrel-4 | Temp. = 195° C. |
| Barrel-5 | Temp. = 200° C. |
| Barrel-6 (Die) | Temp. = 210° C. |
| Screw Speed | 250 rpm |
| Feed Rate | 6.8 kg/hr |
| Batch Size | 600 g |

The torque measured during the melt extrusion of the neat and formulated HDPE was in the range of 28-34%, indicating that the processibility of HDPE was not hampered significantly with low/high molecular weight polycarbonate-siloxane copolymer.

Example 2

The pellets obtained after the melt extrusion of Example 1 were compression molded into 1.85 mm to 1.95 mm thick sheets at a temperature of 195° C.-210° C., with a holding time of 5 min and a cooling time of 5 min. No visual inhomogeneity was evident in the compression sheets. The compression molded sheets, both the neat and formulated HDPE, were then evaluated for ESCR performance according to ASTM D1693-15B (Bell Test).

The compression molded sheets were cut into test specimens having a length of 38 mm and width of 13 mm. A notch of 0.5 mm depth was created at the center of each test specimen prior to storing it in a conditioned environment of 23° C. and humidity of 55% RH. The conditioned specimens were U-bent with the aid of a jig. Ten of the bent specimens for each neat and formulated HDPE materials were placed in an aluminum sample holder and subsequently placed inside a test tube filled with 10% v/v aqueous solution of Igepol CO-630 (nonylphenoxy poly(ethyleneoxy) ethanol, CAS 68412-54-4). The mouth of the test tube was closed with a rubber cork wrapped with aluminum foil. The test specimens placed in the test tube filled with 10% v/v Igepol CO-630 aqueous solution was immersed in an oil bath maintained at 50° C. The time it took to observe the formation of cracks in the test specimens were regularly noted. The time taken for 50% of the specimens (i.e., 5 out of the 10 specimens) to fail (i.e., crack) were reported to infer the ESCR performance of the given composition.

The ESCR performance of the neat HDPE and formulated HDPE incorporating the polycarbonate-siloxane copolymer are presented in Table 2 below:

TABLE 2

| Composition | Time to 50% Fail (hr) |
| --- | --- |
| CC253 (Unimodal HDPE) | 12 |
| CC254 (Bimodal HDPE) | 16 |
| CC253 = 5 wt. % PC-siloxane | 21 |
| CC253 = 10 wt. % PC-siloxane | 32 |
| CC254 = 5 wt. % PC-siloxane | 36 |
| CC254 = 10 wt. % PC-siloxane | 70 |

As can be seen from Table 2, the observed time for 50% of the samples to fail for unimodal (CC253) and bimodal (CC254) HDPE was 12 and 16 hrs, respectively. The time for 50% of the samples to fail is found to be 2-3 times higher for the HDPE compositions incorporating the 5 wt. % and 10 wt. % polycarbonate-siloxane copolymer. Noticeably, not even a single crack was observed in the bimodal HDPE incorporating 10 wt. % polycarbonate-siloxane copolymer in any of the ten samples even after 35 hrs.

Melt mass flow rate (MFR) of neat unimodal (CC253) and bimodal (CC254) HDPE resins measured at 190° C. with a load of 2.16 Kg by ISO 1133-1:2011 method, along with that of a blend of bimodal HDPE (90 wt %) and polycarbonate-siloxane copolymer (10 wt %) are depicted in the Table 3 below. The standard deviation observed during the MFR measurements is 0.1 g/10 min.

TABLE 3

| Composition | MFR (g/10 min) |
| --- | --- |
| CC253 (Unimodal HDPE) | 1.80 |
| CC254 (Bimodal HDPE) | 1.97 |
| CC254 + 10 wt. % PC-siloxane | 2.11 |

As can be seen from Table 3, the observed MFR values for unimodal (CC253) and bimodal (CC254) HDPE was 1.8 and 1.97 g/10 min, respectively. In comparison, the MFR value for the bimodal HDPE composition incorporating 10 wt. % polycarbonate-siloxane copolymer is 2.11 g/10 min. This result indicates that the melt viscosity/flow characteristics of HDPE resins remain mostly unaffected with the incorporation of 10 wt % polycarbonate-siloxane copolymer, though such 10 wt % polycarbonate-siloxane copolymer incorporated HDPE compositions exhibited a superior ESCR performance.

The unstained scanning electron microscope (SEM) image of a blend of bimodal HDPE (CC254) incorporated with 10 wt. % polycarbonate-siloxane copolymer is depicted in the FIG. 1. As seen from the FIG. 1, the polycarbonate-siloxane copolymer is dispersed within HDPE matrix with aggregate size ranging from 0.5-10 μm. Moreover, there is fairly a good interfacial adhesion of aggregates of polycarbonate-siloxane copolymer with HDPE matrix.

Figure 2:
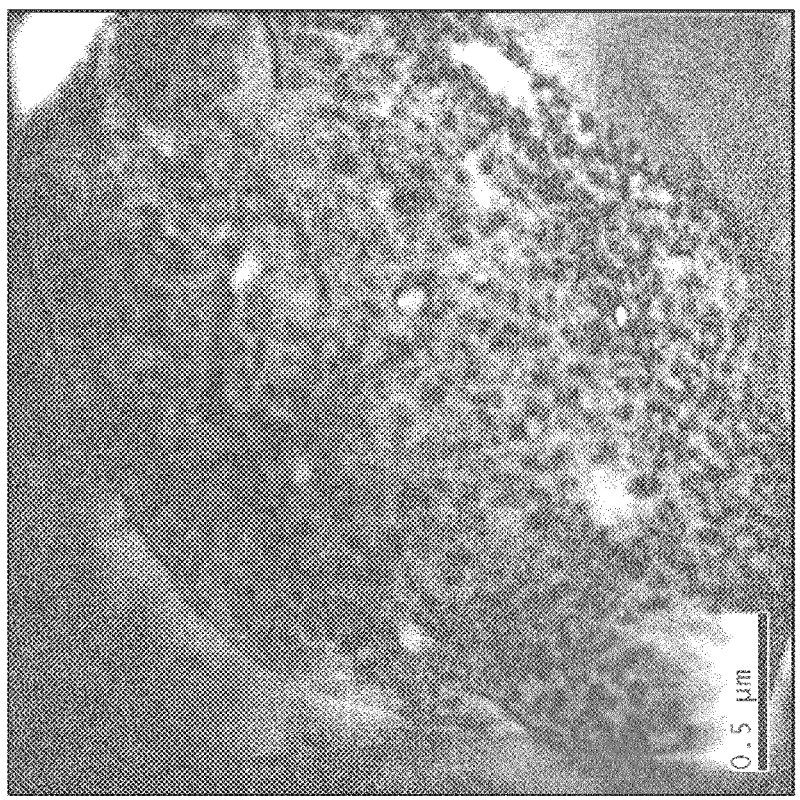
FIG. 2 is an unstained high resolution transmission electron microscope (TEM) image of a polymer blend of bimodal HDPE incorporated with 10 wt % polycarbonate-siloxane.

The unstained high resolution transmission electron microscope (TEM) image of a blend of bimodal HDPE (CC254) incorporated with 10 wt % polycarbonate-siloxane copolymer is depicted in the FIG. 2. As seen from FIG. 2, the dark domains of siloxane are randomly distributed in the PC-siloxane aggregates dispersed within the HDPE matrix.

The invention claimed is:

1. A polyethylene composition having increased environmental stress crack resistance, the composition comprising a polymer blend of a high density polyethylene (HDPE) and a polycarbonate-siloxane copolymer present in an amount of from 7 wt. % to 15 wt. % by a total weight of the polymer blend, wherein the high density polyethylene is present in an amount of 85 wt. % to 93 wt. % by the total weight of the polymer blend.

2. The composition of claim 1, wherein the HDPE is at least one of an unimodal and a bimodal HDPE.

3. The composition of claim 1, wherein the polycarbonate of the polycarbonate-siloxane copolymer is a bisphenol-A polycarbonate.

4. The composition of claim 1, wherein the polycarbonate-siloxane copolymer is a bisphenol-A and eugenol endcapped siloxane copolymer.

5. The composition of claim 1, wherein the siloxane is present in the polycarbonate-siloxane copolymer in an amount of from 2 mol % to 25 mol %.

6. The composition of claim 1, wherein the polymer blend provides a molded article having an ESCR of at least 40 hours as determined by ASTM D1693-15B.

7. The composition of claim 1, wherein the HDPE is a copolymer with comonomers selected from $C_3$ to $C_{10}$ alpha olefin monomers, the comonomers being present in the HDPE copolymer in an amount of from 2 wt. % or less.

8. The composition of claim 1, wherein the HDPE has a melt flow rate at 190° C. and 2.16 kg of 0.2 dg/min to 20 dg/min and/or a density of 945 kg/m$^3$ to 965 kg/m$^3$.

9. The composition of claim 1, wherein the siloxane of the polycarbonate-siloxane copolymer has a chain length of from 5 to 65 siloxane repeating units.

10. The composition of claim 1, wherein the polymer blend further comprises a polycarbonate homopolymer.

11. The composition of claim 1, further comprising an additive of at least one of a nucleating agent, a heat conductive agent, a tie agent, an antiblocking agent, an antistatic agent, an antioxidant, a neutralizing agent, an acid scavenger, a blowing agent, a crystallization aid, a dye, a flame retardant agent, a filler, an impact modifier, a mold release agent, an oil, another polymer, a pigment, a processing agent, a reinforcing agent, a stabilizer, an UV resistance agent, a clarifying agent, a slip agent, a flow modifying agent, and combinations thereof.

12. An article comprising the composition of claim 1.

13. A method of manufacture of an article, comprising injection molding, blow molding, compression molding, sheet extrusion, film blowing, pipe extrusion, profile extrusion, calendaring, or thermoforming the composition of claim 1.

14. A method of forming a polyethylene composition having increased environmental stress crack resistance, the method comprising modifying a high density polyethylene (HDPE) by combining the HDPE with a polycarbonate-siloxane copolymer in a polymer blend, the polycarbonate-siloxane copolymer being present in an amount of from 7 wt. % to 15 wt. % by total weight of the polymer blend, wherein the high density polyethylene is present in an amount of 85 wt. % to 93 wt. % by the total weight of the polymer blend.

15. The composition of claim 6, wherein the polymer blend provides a molded article having an ESCR of from 40 hours to 1000 hours as determined by ASTM D1693-15B.

16. The polyethylene composition of claim 1, wherein the HDPE is a bimodal HDPE.

17. A polyethylene composition having increased environmental stress crack resistance, the composition comprising a polymer blend of:
   a high density polyethylene,
   a polycarbonate-siloxane copolymer, and
   a polycarbonate homopolymer,
   wherein the high density polyethylene is present in an amount of 45 wt. % to 92.1 wt. %,
   the polycarbonate-siloxane copolymer is present in an amount of 7 wt. % to 15 wt. %, and
   the polycarbonate homopolymer is present in an amount of 0.1 wt. % to 40 wt. %, each based on a total weight of the polymer blend.

18. The article of claim 12, wherein the article is a container, a beverage container cap, a lid, a sheet, a pipe, a pipe coupling, a bottle, a cup, a tray, a pallet, or a toy.

19. An article comprising a polyethylene composition having increased environmental stress crack resistance, the composition comprising a polymer blend of a high density polyethylene (HDPE) and a polycarbonate-siloxane copolymer present in an amount of from 7 wt. % to 15 wt. % by a total weight of the polymer blend, wherein the article is a cap or lid.

\* \* \* \* \*